(12) United States Patent
Kothuri et al.

(10) Patent No.: US 7,877,405 B2
(45) Date of Patent: Jan. 25, 2011

(54) PRUNING OF SPATIAL QUERIES USING INDEX ROOT MBRS ON PARTITIONED INDEXES

(75) Inventors: Ravikanth V. Kothuri, Nashua, NH (US); Siva Ravada, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 316 days.

(21) Appl. No.: 11/030,303

(22) Filed: Jan. 7, 2005

(65) Prior Publication Data

US 2006/0155679 A1    Jul. 13, 2006

(51) Int. Cl.
*G06F 17/30* (2006.01)
(52) U.S. Cl. .............................. 707/769; 707/999.003; 707/999.009; 707/E17.007
(58) Field of Classification Search ........................ None
See application file for complete search history.

(56) References Cited

U.S. PATENT DOCUMENTS

| | | | |
|---|---|---|---|
| 6,263,334 B1 * | 7/2001 | Fayyad et al. ................... 707/5 |
| 6,604,068 B1 * | 8/2003 | Bukowski et al. .............. 703/22 |
| 6,732,120 B1 * | 5/2004 | Du ........................... 707/104.1 |
| 6,771,840 B1 * | 8/2004 | Ioannou et al. ............. 382/285 |
| 6,950,828 B2 * | 9/2005 | Shaw et al. .............. 707/103 R |
| 7,076,243 B2 * | 7/2006 | Parupudi et al. .......... 455/414.1 |
| 7,080,065 B1 * | 7/2006 | Kothuri et al. .................. 707/3 |
| 7,185,023 B2 * | 2/2007 | Kothuri ..................... 707/104.1 |
| 2003/0061249 A1 * | 3/2003 | Ramaswamy et al. ....... 708/136 |
| 2003/0187867 A1 * | 10/2003 | Smartt ......................... 707/102 |
| 2003/0212650 A1 * | 11/2003 | Adler et al. ..................... 707/1 |
| 2004/0078750 A1 * | 4/2004 | Frank .......................... 715/500 |
| 2004/0117358 A1 * | 6/2004 | von Kaenel et al. ............ 707/3 |
| 2004/0193566 A1 * | 9/2004 | Kothuri ......................... 707/1 |
| 2004/0230554 A1 * | 11/2004 | An et al. ........................ 707/1 |
| 2005/0015216 A1 * | 1/2005 | Kothuri ....................... 702/158 |
| 2005/0091193 A1 * | 4/2005 | Frank et al. .................... 707/1 |
| 2005/0091223 A1 * | 4/2005 | Shaw et al. ................. 707/100 |
| 2005/0097108 A1 * | 5/2005 | Wang et al. ................. 707/100 |

* cited by examiner

*Primary Examiner*—Don Wong
*Assistant Examiner*—Shyue Jiunn Hwa
(74) *Attorney, Agent, or Firm*—Hanify & King, PC

(57) ABSTRACT

A method, system, and computer program product provides improved performance for queries on local partitioned indexes. A method of performing a database query comprises receiving a query of spatial data in a database, the database comprising at least one partitioned spatial index, obtaining metadata relating to all partitions of the spatial index using array-fetching techniques, determining, for each partition, whether the partition is relevant to the query by comparing with "footprint" (root_mbr) information stored in the metadata for the partition, and processing the query on each relevant partition.

15 Claims, 4 Drawing Sheets

PRUNING OF SPATIAL QUERIES USING INDEX ROOT MBRS ON PARTITIONED INDEXES

BACKGROUND OF THE INVENTION

1. Field of the Invention

The present invention relates to a system, method, and computer program product for providing improved performance for queries on local partitioned indexes of spatial data using the root minimum bounding rectangles of the partitions of the indexes.

2. Description of the Related Art

In a relational database, data is stored in two-dimensional tables that are composed of rows and columns. The database management system manages the data in the database and enables a user to store data, update it, and retrieve it.

The database management system is software that provides the capability to create and manage the database. A typical database consists of physical and logical structures in which system, user, and control information is stored. Because the physical and logical structures are separate, the physical storage of data can be managed without affecting the access to logical storage structures.

One type of data that may be stored in a database is spatial data. A common example of spatial data can be seen in a road map. A road map is a two-dimensional object that contains points, lines, and polygons that can represent cities, roads, and political boundaries such as states or provinces. A road map is a visualization of geographic information. The location of cities, roads, and political boundaries that exist on the surface of the Earth are projected onto a two-dimensional display or piece of paper, preserving the relative positions and relative distances of the rendered objects.

The data that indicates the Earth location (latitude and longitude, or height and depth) of these rendered objects is the spatial data. When the map is rendered, this spatial data is used to project the locations of the objects on a two-dimensional piece of paper. A GIS is often used to store, retrieve, and render this Earth-relative spatial data.

Types of spatial data that can be stored using Spatial other than GIS data include data from computer-aided design (CAD) and computer-aided manufacturing (CAM) systems. Instead of operating on objects on a geographic scale, CAD/CAM systems work on a smaller scale, such as for an automobile engine or printed circuit boards.

A DBMS that handles spatial data includes spatial features that let a user store, index, and manage location content (assets, buildings, roads, land parcels, sales regions, and so on.) and query location relationships using the power of the database. The DBMS may also support advanced spatial features such as linear reference support and coordinate systems.

In a typical DBMS, after spatial data has been loaded into the database, a spatial index is created on the data to enable efficient query performance using the data. Once data has been loaded into the spatial tables through either bulk or transactional loading, a spatial index must be created on the tables for efficient access to the data. In many DBMSs, it is possible to create partitioned spatial indexes.

Modern enterprises frequently run mission-critical databases containing upwards of several hundred gigabytes and, in many cases, several terabytes of data. These enterprises are challenged by the support and maintenance requirements of very large databases (VLDB), and must devise methods to meet those challenges. One way to meet VLDB demands is to create and use partitioned tables and indexes. Partitioned tables allow your data to be broken down into smaller, more manageable pieces called partitions, or even subpartitions. Indexes can be partitioned in similar fashion. Each partition is stored in its own segment and can be managed individually. It can function independently of the other partitions, thus providing a structure that can be better tuned for availability and performance.

Partitions and subpartitions of a table or index all share the same logical attributes. For example, all partitions (or subpartitions) in a table share the same column and constraint definitions, and all partitions (or subpartitions) of an index share the same index options. They can, however, have different physical attributes.

Queries on a "local partitioned index" (i.e., a table that has local indexes one per partition) are answered by posing the query on each partition (identified by the database engine using the non-spatial part of the query predicate). This is terribly slow, as the query is processed afresh for each partition, the metadata is read for each partition and so on. A need arises for a technique that provides improved performance for queries on local partitioned indexes.

SUMMARY OF THE INVENTION

The present invention provides improved performance for queries on local partitioned indexes of spatial data using the root minimum bounding rectangles of the partitions of the indexes.

In one embodiment of the present invention, a method of performing a database query comprises receiving a query of spatial data in a database, the database comprising at least one partitioned spatial index, obtaining metadata relating to all partitions of the spatial index, determining, for each partition, whether the partition is relevant to the query, using the metadata for the partition, and processing the query on each relevant partition.

In one aspect of the present invention, the metadata for a partition comprises a minimum bounding rectangle for spatial data in the partition. It is determined whether a partition is relevant to the query by determining whether the minimum bounding rectangle for spatial data in the partition intersects with a minimum bounding rectangle for the query. The query is processed on each relevant partition by performing an exact comparison of each point, boundary, area, or extent of the query with each point, boundary, area, or extent of the data in the partition. It is determined whether a partition is relevant to the query by determining whether the minimum bounding rectangle for spatial data in the partition intersects with the query. The query is processed on each relevant partition by performing an exact comparison of each point, boundary, area, or extent of the query with each point, boundary, area, or extent of the data in the partition.

In one aspect of the present invention, the metadata relating to all partitions of the spatial index is obtained by obtaining all columns of metadata for a first partition of the spatial index and obtaining distinct columns of metadata for all partitions. The distinct columns of metadata are columns that have different values for different partitions. The distinct columns of metadata for all partitions are obtained using an array fetch technique.

BRIEF DESCRIPTION OF THE DRAWINGS

Further features and advantages of the invention can be ascertained from the following detailed description that is provided in connection with the drawings described below.

DETAILED DESCRIPTION OF THE PREFERRED EMBODIMENTS

Figure 1:
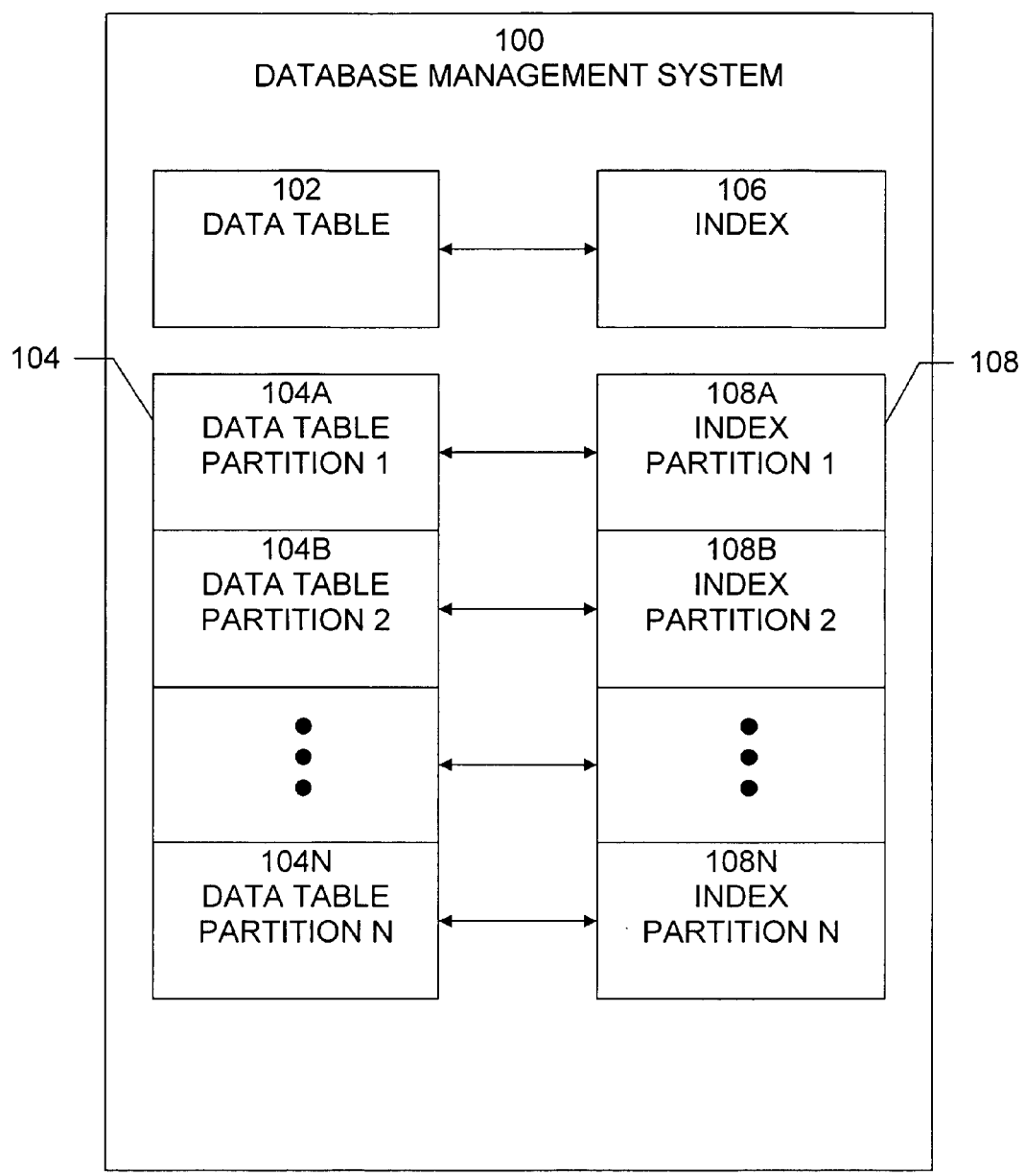
FIG. 1 is an exemplary block diagram of a database management system in which the present invention may be implemented.

An example of a database management system (DBMS) 100, in which the present invention may be implemented, is shown in FIG. 1. DBMS 100 includes one or more data tables, such as data tables 100 and 104. Associated with each data table is an index. Use of the index provides fast and efficient performance of queries on the data in the data table. For example, associated with data table 100 is an index, such as index 104, that has been built on the data table. Data table 104 is an example of a partitioned data table. A data table may be partitioned when the complete table is too large to allow efficient database processing of the table. Data table 104 includes a plurality of partitions, such as data table partition 1 104A, data table partition 2 104B, and data table partition N 104N. Index 108 is associated with data table 104 and has been built on the data in data table 104. Thus, index 108 includes a plurality of partitions, such as index partition 1 108A, index partition 2 108B, and index partition N 108N.

For spatial data, it is preferred that each partition of the data table includes spatial data representing a substantially contiguous spatial region. For example, a geographic data table may include partitions, each representing 100 km×100 km regions, individual states or counties, or the like.

Figure 2:
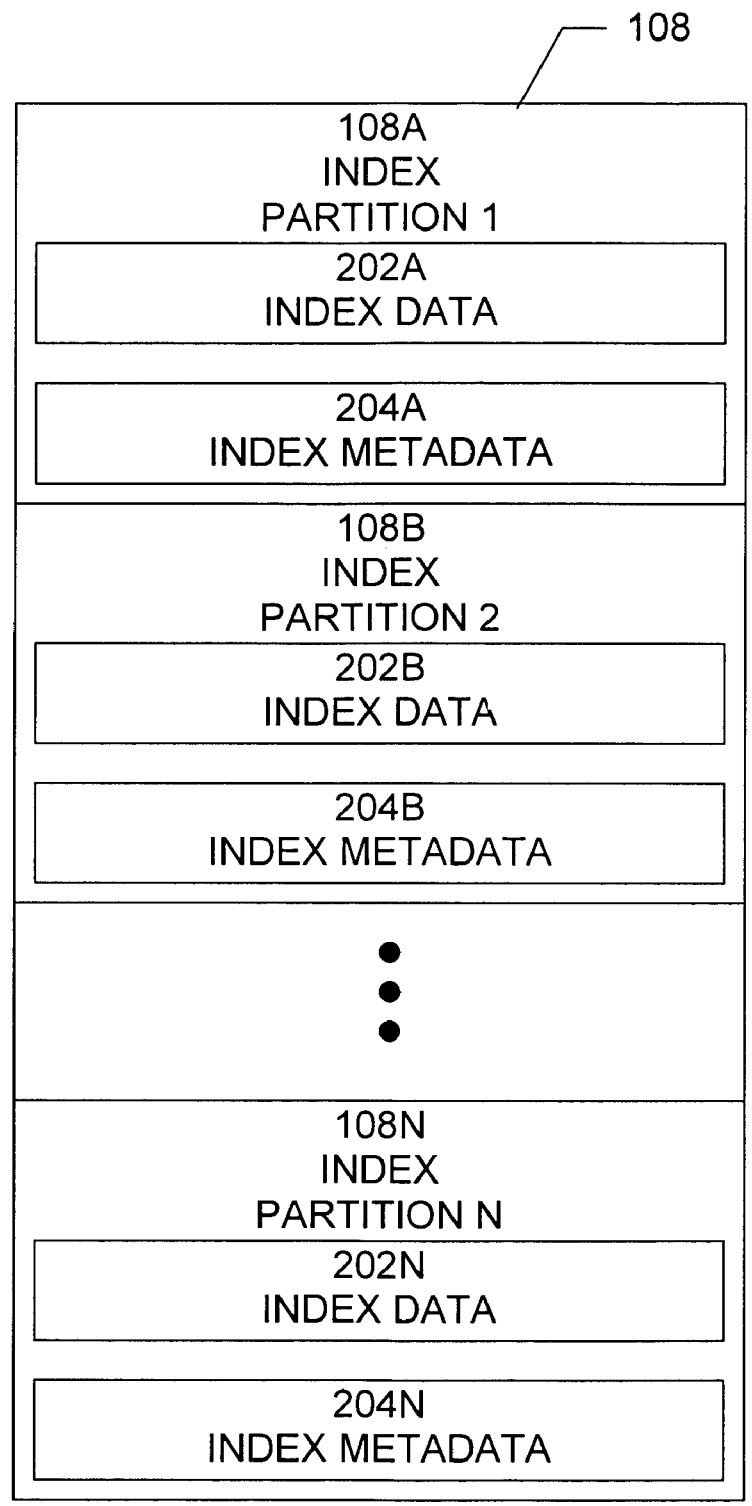
FIG. 2 is an example of a format of a partitioned index shown in FIG. 1.

An example of a format of a partitioned index 108 is shown in FIG. 2. Partitioned index 108 includes a plurality of partitions, such as such as index partition 1 108A, index partition 2 108B, and index partition N 108N. Each index partition includes data, such as index data and index metadata. For example, index partition 1 108A includes index data 202A and index metadata 204A, index partition 2 108B includes index data 202B and index metadata 204B, and index partition N 108N includes index data 202N and index metadata 204N. Index data, such as index data 202A, includes the actual index partition to the associated data table partition. Typically, the index itself is a sorted list of the contents of some particular table column, with pointers to the row associated with the value. An index allows a set of table rows matching some criterion to be located quickly. Various methods of indexing are commonly used, including b-trees, hashes, linked lists, quadtrees, and R-trees. When the data table includes spatial data, a spatial index is created on the data to enable efficient query performance using the data, and for large databases, partitioned spatial indexes are created.

Index metadata, such as index metadata partition 204A, includes data about the data in the index data partition and the data table partition. Typically, such metadata includes information such as ranges of data in the data table partition and other partition-specific information about the index data partition and the data table partition.

One example of metadata that may be stored for a spatial index, such as local partitioned domain indexes, may be termed a user_sdo_index_metadata view that includes attributes such as:

sdo_index_name: name of the spatial index.

sdo_index_type: indicates whether it is a quadtree or an R-tree.

sdo_partition_flag: indicates whether or not the index is a local partitioned index.

sdo_index_partition: this corresponds to the IndexPartition name of the ODCIIndexInfo structure. This, in combination with the indexname, uniquely identifies the index_table that stores the local index for a partition. Note that "indextable" is a "unique" attribute in the user_sdo_index_metadata view.

sdo_index_table: table name that stores actual index data. For each index, there is one index_table per partition. As a result, for partitioned indexes, sdo_index_name and sdo_index_partition uniquely identify sdo_index_table.

sdo_ts_name: table scheme name sdo_column_name: column name of the table that is spatially indexed other local-index-specific attributes including sdo_level, sdo_numtiles (for quadtrees), and sdo_rtree_root, sdo_rtree_height (for R-trees) along with tablespace and other storage parameters.

sdo_root_mbr: is of type SDO_GEOMETRY and stores the minimum bounding rectangle for the data in that partition.

For spatial data, the metadata includes information relating to the spatial data in the data table partition and the spatial index partition. For spatial data, it is preferred that each partition of the data table includes spatial data representing a substantially contiguous spatial region. For example, a geographic data table may include partitions, each representing 100 km×100 km regions, individual states or counties, or the like. Partitions representing substantially contiguous regions are preferred over partitions including scattered regions because for substantially contiguous regions, a minimum bounding rectangle (MBR) may be efficiently defined. The MBR is the smallest rectangle that completely encloses all of a defined spatial region. The root MBR for a partition is the smallest rectangle that completely encloses all of the spatial data in the partition. Since the MBR is typically larger than the defined region that it encloses, the more compact and more contiguous the target region is, the more efficiently the MBR may be defined for the data defining the region. The root MBR for a partition is included in the metadata that is stored for that partition.

In the prior art, queries on a "local partitioned index" (i.e., a table that has local indexes one per partition) are answered by posing the query on each partition (identified by the database engine using the non-spatial part of the query predicate). This is terribly slow, as the query is processed afresh for each partition, the metadata is read for each partition and so on.

Figure 3:
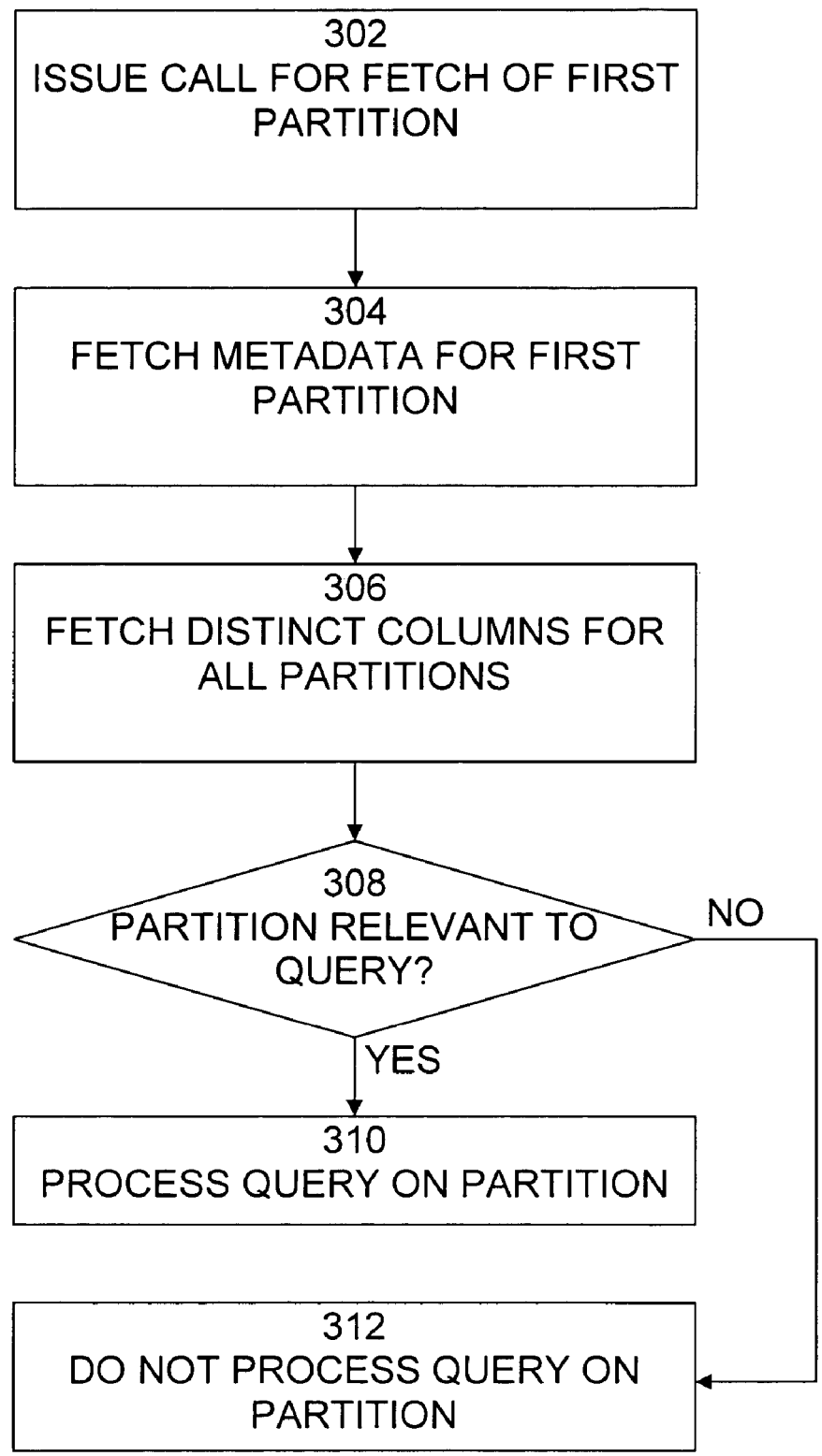
FIG. 3 is an exemplary flow diagram of a spatial query process.

In the present invention, the performance of queries on spatial data using a partitioned spatial index is greatly enhanced. A flow diagram of a spatial query process 300 is shown in FIG. 3. Process 300 begins with step 302, in which a call for a fetch of a first partition of metadata is issued. In step 304, in response to the call for the fetch, all columns of metadata for the first partition are fetched. In step 306, the "distinct" columns (the columns that have different values for different partitions) are fetched for all partitions. Preferably, these fetches are done using an "array fetch" technique, since, in many DBMSs, the "array fetch" part is typically done very fast.

In step 308, for each partition, it is determined whether the query is relevant to the partition. This is done by determining whether the region defined by the spatial query overlaps any portion of the spatial data of the partition. This may be quickly and efficiently accomplished by determining whether the root MBR for the partition, which is included in the index metadata in the distinct columns, intersects the query window MBR. If the root MBR for the partition intersects the query window MBR, then the process continues with step 310, in which the query is processed on the partition. Likewise, if the root MBR for the partition does not intersect the query window MBR, then the process continues with step 312, in which the query is not processed on the partition. This particular elimination mechanism prunes irrelevant partitions and speeds up query processing by a factor of 4 on a table with 162 partitions. Typically, in step 310, the query is processed on a partition by performing an exact comparison of the query first with the index information, and then with the data for the partition.

The root MBR for a partition is the smallest rectangle that completely encloses all of the spatial data in the partition. The query window MBR is the smallest rectangle that completely encloses the region defined by the query. Since the MBR is typically larger than the defined region that it encloses, the fact that the root MBR for the partition intersects the query window MBR does not guarantee that the partition includes data relevant to the query. However, the lack of intersection between the root MBR for the partition and the query window MBR does guarantee that the partition does not include data relevant to the query. Thus, in some cases, it may be preferable to determine whether the root MBR for the partition intersects the query itself, rather than the query window MBR. This is particularly true if the query window is rectangular, or otherwise relatively simple.

Figure 4:
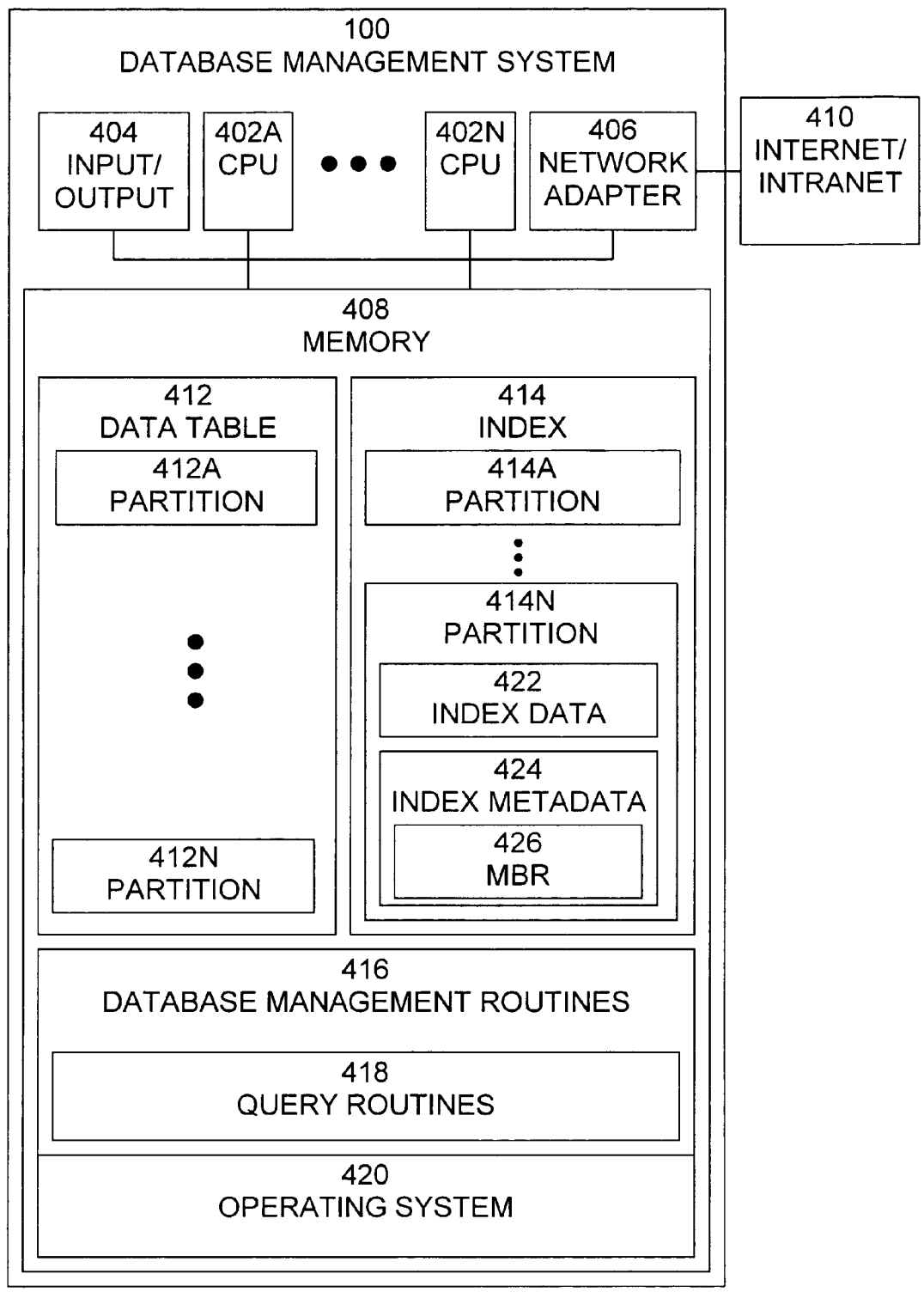
FIG. 4 is an exemplary block diagram of a database management system, in which the present invention may be implemented.

An exemplary block diagram of a database management system (DBMS) 100, shown in FIG. 1, is shown in FIG. 4. DBMS 100 is typically a programmed general-purpose computer system, such as a personal computer, workstation, server system, and minicomputer or mainframe computer. DBMS 100 includes one or more processors (CPUs) 402A-402N, input/output circuitry 404, network adapter 406, and memory 408. CPUs 402A-402N execute program instructions in order to carry out the functions of the present invention. Typically, CPUs 402A-402N are one or more microprocessors, such as an INTEL PENTIUM® processor. FIG. 4 illustrates an embodiment in which DBMS 100 is implemented as a single multi-processor computer system, in which multiple processors 402A-402N share system resources, such as memory 408, input/output circuitry 404, and network adapter 406. However, the present invention also contemplates embodiments in which DBMS 100 is implemented as a plurality of networked computer systems, which may be single-processor computer systems, multi-processor computer systems, or a mix thereof.

Input/output circuitry 404 provides the capability to input data to, or output data from, DBMS 100. For example, input/output circuitry may include input devices, such as keyboards, mice, touchpads, trackballs, scanners, etc., output devices, such as video adapters, monitors, printers, etc., and input/output devices, such as, modems, etc. Network adapter 406 interfaces DBMS 100 with Internet/intranet 410. Internet/intranet 410 may include one or more standard local area network (LAN) or wide area network (WAN), such as Ethernet, Token Ring, the Internet, or a private or proprietary LAN/WAN.

Memory 408 stores program instructions that are executed by, and data that are used and processed by, CPU 402 to perform the functions of DBMS 100. Memory 408 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 408 vary depending upon the function that DBMS 100 is programmed to perform. One of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 4, memory 408 includes data table 412, which includes partitions 412A-412N, index 414, which includes partitions 414A-414N, database management routines 418, which include query routines 418, and operating system 420. Data table 412 is a partitioned data table, which includes a plurality of partitions, such as partitions 412A-412N. A data table may be partitioned when the complete table is too large to allow efficient database processing of the table. Index 414 is associated with data table 412 and has been built on the data in data table 412. Thus, index 414 includes a plurality of partitions, such as partitions 414A-414N. Each index partition includes data, such as index data and index metadata. For example, index partition 414N includes index data 422 and index metadata 424. Index data, such as index data 422, includes the actual index partition to the associated data table partition. Index metadata, such as index metadata 424, includes data about the data in the index data partition and the data table partition, such as MBR 426. MBR 426 is the root MBR for partition 414A and is the smallest rectangle that completely encloses all of the spatial data in the partition.

Database management routines 416 include software routines that provide the database management functionality of DBMS 100. Database management routines typically include a database query language interface, such as a Structured Query Language (SQL) interface, a Data Manipulation Language (DML) interface, and database processing routines to carry out the data manipulations specified by the DML. For example, an SQL interface accepts database queries using the SQL database query language, converts the queries to a series of DML statements, calls the database processing routines to perform the series of DMLs, and returns the results of the query to the source of the query. In particular, database management routines 416 include query routines 418, which implement the spatial query process shown in FIG. 3.

Operating system 420 provides overall system functionality.

As shown in FIG. 4, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of performing a query on spatial data in a database comprising:
   receiving the query on the spatial data in the database, the database comprising at least one partitioned data table where each data table partition in the at least one partitioned data table includes spatial data representing a contiguous spatial region and at least one partitioned spatial index where each spatial index partition is for a data table partition in the at least one partitioned data table and includes index data to the data table partition and index metadata defining the data table partition and the spatial index partition;
   obtaining index metadata from a distinct column of the respective spatial index partition for each data table partition wherein the index metadata for the spatial data in each data table partition comprises a minimum bounding rectangle for spatial data in the respective data table partition;
   determining, for each data table partition, whether the data table partition is relevant to the query, using the index metadata for the data table partition by determining whether the minimum bounding rectangle for spatial data in the data table partition intersects with a minimum bounding rectangle for the query;
   processing the query on each relevant data table partition; and
   retrieving spatial data from a relevant data table partition based on an intersection between the spatial data and the query.

2. The method of claim 1, wherein the query is further processed on each relevant data table partition by performing an exact comparison of the query mad index-information in the index for the partition.

3. The method of claim 1, wherein the metadata relating to all data table partitions is obtained by:
   obtaining all columns of metadata for a first data table partition; and obtaining distinct columns of metadata for all data table partitions.

4. The method of claim 3, wherein the distinct columns of metadata are columns that have different values for different data table partitions.

5. The method of claim 3, wherein the distinct columns of metadata for all data table partitions are obtained using an array fetch technique.

6. A system for performing a database query comprising: a processor operable to execute computer program instructions;
   a memory operable to store computer program instructions executable by the processor; and computer program instructions stored in the memory and executable to perform the steps of:
   receiving the query on the spatial data in the database, the database comprising at least one partitioned data table where each data table partition in the at least one partitioned data table includes spatial data representing a contiguous spatial region and at least one partitioned spatial index where each spatial index partition is for a data table partition in the at least one partitioned data table and includes index data to the data table partition and index metadata defining the data table partition and the spatial index partition;
   obtaining index metadata from a distinct column of the respective spatial index partition for each data table partition wherein the index metadata for the spatial data in each data table partition comprises a minimum bounding rectangle for spatial data in the respective data table partition;
   determining, for each data table partition, whether the data table partition is relevant to the query, using the index metadata for the data table partition by determining whether the minimum bounding rectangle for spatial data in the data table partition intersects with a minimum bounding rectangle for the query;
   processing the query on each relevant data table partition; and
   retrieving spatial data from a relevant data table partition based on an intersection between the spatial data and the query.

7. The system of claim 6, wherein the query is further processed on each relevant data table partition by performing an exact comparison of the query and index-information in the index for the partition.

8. The system of claim 6, wherein the metadata relating to all data table partitions is obtained by:
   obtaining all columns of metadata for a first data table partition; and obtaining distinct columns of metadata for all data table partitions.

9. The system of claim 8, wherein the distinct columns of metadata are wherein are columns that have different value for different data table partitions.

10. The system of claim 8, wherein the distinct columns of metadata for all data table partitions are obtained using an array fetch technique.

11. A computer program product for performing a database query comprising:
   a memory;

computer program instructions, stored on the memory, executable by a processor, for performing the steps of receiving the query on the spatial data in the database, the database comprising at least one partitioned data table where each data table partition in the at least one partitioned data table includes spatial data representing a contiguous spatial region and at least one partitioned spatial index where each spatial index partition is for a data table partition in the at least one partitioned data table and includes index data to the data table partition and index metadata defining the data table partition and the spatial index partition;

obtaining index metadata from a distinct column of the respective spatial index partition for each data table partition wherein the index metadata for the spatial data in each data table partition comprises a minimum bounding rectangle for spatial data in the respective data table partition;

determining, for each data table partition, whether the data table partition is relevant to the query, using the index metadata for the data table partition by determining whether the minimum bounding rectangle for spatial data in the data table partition intersects with a minimum bounding rectangle for the query;

determining, for each data table partition, whether the data table partition is relevant to the query, using the index metadata for the data table partition;

processing the query on each relevant data table partition; and retrieving spatial data from a relevant data table partition based on an intersection between the spatial data and the query.

12. The computer program product of claim 11, wherein the query is further processed on each relevant data table partition by performing an exact comparison of the query and index-information in the index for the partition.

13. The computer program product of claim 11, wherein the metadata relating to all data table partitions is obtained by:
    obtaining all columns of metadata for a first data table partition; and obtaining distinct columns of metadata for all data table partitions.

14. The computer program product of claim 13, wherein the distinct columns of metadata are wherein are columns that have different value for different data table partitions.

15. The computer program product of claim 13, wherein the distinct columns of metadata for all data table partitions are obtained using an array fetch technique.

* * * * *

UNITED STATES PATENT AND TRADEMARK OFFICE
CERTIFICATE OF CORRECTION

PATENT NO. : 7,877,405 B2
APPLICATION NO. : 11/030303
DATED : January 25, 2011
INVENTOR(S) : Kothuri et al.

Page 1 of 1

It is certified that error appears in the above-identified patent and that said Letters Patent is hereby corrected as shown below:

In column 8, line 3, in Claim 2, delete "mad" and insert -- and --, therefor.

In column 8, line 60, after "metadata" delete "are wherein".

Signed and Sealed this
Twenty-fifth Day of October, 2011

David J. Kappos
*Director of the United States Patent and Trademark Office*